(12) United States Patent
Acosta et al.

(10) Patent No.: US 7,527,207 B2
(45) Date of Patent: May 5, 2009

(54) TRIGGERING ILLUMINATION FOR A DATA READER

(75) Inventors: Jorge L. Acosta, Eugene, OR (US); Mohamed A. Salam, Torrence, CA (US)

(73) Assignee: Datalogic Scanning, Inc., Eugene, OR (US)

( * ) Notice: Subject to any disclaimer, the term of this patent is extended or adjusted under 35 U.S.C. 154(b) by 196 days.

(21) Appl. No.: 11/293,863

(22) Filed: Dec. 1, 2005

(65) Prior Publication Data

US 2006/0180670 A1 Aug. 17, 2006

Related U.S. Application Data

(60) Provisional application No. 60/632,696, filed on Dec. 1, 2004.

(51) Int. Cl.
*G06K 7/10* (2006.01)
(52) U.S. Cl. .............................. 235/462.31; 235/462.17
(58) Field of Classification Search ...... 235/462.31–32, 235/462.08, 462.11, 462.17, 462.2–24, 462.3, 235/462.42, 462.48, 468
See application file for complete search history.

(56) References Cited

U.S. PATENT DOCUMENTS

| | | | |
|---|---|---|---|
| 4,603,262 A | 7/1986 | Eastman et al. | |
| 4,982,176 A | 1/1991 | Schwarz | |
| 4,997,271 A | 3/1991 | Shanks | |
| 5,015,994 A | 5/1991 | Hoberman et al. | |
| 5,184,114 A | 2/1993 | Brown | |
| 5,256,865 A * | 10/1993 | Wike et al. ............. | 235/462.15 |
| 5,260,553 A | 11/1993 | Rockstein et al. | |
| 5,260,554 A | 11/1993 | Grodevant | |
| 5,280,162 A | 1/1994 | Marwin | |
| 5,296,689 A | 3/1994 | Reddersen et al. | |

(Continued)

FOREIGN PATENT DOCUMENTS

EP 1061467 A2 12/2000

(Continued)

OTHER PUBLICATIONS

Harris, Tom, How Stuff Works, Inc., "How Red-light Cameras Work", http://electronics.howstuffworks.com/red-light-camera.htm/printable, visited Oct. 23, 2004, 8 pages.

(Continued)

*Primary Examiner*—Daniel St.Cyr
(74) *Attorney, Agent, or Firm*—Stoel Rives LLP

(57) ABSTRACT

Methods are disclosed for triggering a source of visible light in connection with a data reader in response to a sensed proximity of an item. In one configuration, a data reader includes a imaging reader, such as a CMOS imager, that is sensitive to both infrared illumination and visible light. The imaging reader may be operable to read a symbol, such as a barcode or other optical code, via reflected infrared illumination, reflected visible light, or both. When characteristics of reflected illumination received by the imaging reader indicate that presence or movement of an item in the visible scan zone, the visible light source may be triggered to illuminate the item and thereby facilitate reading of the symbol using the same imagine reader as is used to sense the presence of the item. The visible light source may also be triggered to provide visual feedback.

37 Claims, 9 Drawing Sheets

U.S. PATENT DOCUMENTS

| | | | |
|---|---|---|---|
| 5,340,971 A | | 8/1994 | Rockstein et al. |
| 5,340,973 A | | 8/1994 | Knowles et al. |
| 5,354,977 A | | 10/1994 | Roustaei |
| 5,365,597 A | | 11/1994 | Holeva |
| 5,449,891 A | * | 9/1995 | Giebel .................. 235/462.31 |
| 5,468,951 A | | 11/1995 | Knowles et al. |
| 5,525,789 A | | 6/1996 | Rockstein et al. |
| 5,623,137 A | | 4/1997 | Powers et al. |
| 5,646,390 A | | 7/1997 | Wang et al. |
| 5,796,091 A | | 8/1998 | Schmidt et al. |
| 5,834,754 A | * | 11/1998 | Feng et al. ............. 235/472.01 |
| 5,981,944 A | | 11/1999 | Ito |
| 6,006,990 A | | 12/1999 | Ye et al. |
| RE36,528 E | | 1/2000 | Roustaei |
| 6,056,198 A | | 5/2000 | Rudeen et al. |
| 6,073,851 A | | 6/2000 | Olmstead et al. |
| 6,184,534 B1 | | 2/2001 | Stephany et al. |
| 6,223,986 B1 | | 5/2001 | Bobba et al. |
| 6,347,163 B2 | | 2/2002 | Roustaei |
| 6,357,659 B1 | | 3/2002 | Kelly et al. |
| 6,493,061 B1 | | 12/2002 | Arita et al. |
| 6,575,368 B1 | | 6/2003 | Tamburrini et al. |
| 6,575,369 B1 | | 6/2003 | Knowles et al. |
| 6,585,159 B1 | | 7/2003 | Meier et al. |
| 6,629,640 B2 | | 10/2003 | Dorris et al. |
| 6,695,209 B1 | * | 2/2004 | La .......................... 235/462.2 |
| 6,817,525 B2 | | 11/2004 | Piva et al. |
| 6,980,692 B2 | | 12/2005 | Chamberlain |
| 7,014,114 B2 | * | 3/2006 | Maiman .................. 235/454 |
| 7,036,735 B2 | * | 5/2006 | Hepworth et al. ........... 235/454 |
| 7,204,418 B2 | | 4/2007 | Joseph et al. |
| 7,234,641 B2 | | 6/2007 | Olmstead |
| 2002/0100804 A1 | | 8/2002 | Byun et al. |
| 2002/0125411 A1 | | 9/2002 | Christy |
| 2003/0222147 A1 | | 12/2003 | Havens et al. |
| 2004/0164165 A1 | | 8/2004 | Havens et al. |
| 2005/0078851 A1 | | 4/2005 | Jones et al. |
| 2005/0237476 A1 | | 10/2005 | Braun |
| 2006/0113389 A1 | * | 6/2006 | Barkan .................. 235/462.21 |
| 2006/0163355 A1 | | 7/2006 | Olmstead et al. |
| 2006/0164541 A1 | | 7/2006 | Olmstead et al. |
| 2006/0249581 A1 | | 11/2006 | Smith |

FOREIGN PATENT DOCUMENTS

| | | | |
|---|---|---|---|
| WO | WO 2006/060785 A3 | 11/2006 | |

OTHER PUBLICATIONS

Glolab, "How Infrared motion detector components work", http://www.glolab.com/pirparts/infrared.html, visited Oct. 23, 2004, 5 pages.

How Stuff Works, Inc., "How do motion sensing lights and burglar alarms work?", http://www.howstuffworks.com/question238.htm, visited Oct. 23, 2004, 3 pages.

Amendment and Response to Office Action, U.S. Appl. No. 11/044,825, Data Reader and Methods for Imaging Targets Subject to Specular Reflection, dated Nov. 2, 2007, 19 pages.

Turchetta, Renato, Spring, Kenneth R., Davidson, Michael W., Molecular Expressions Microscopy Primer: Digital Imaging in Optical Microscopy, "Introduction to CMOS Image Sensors," http://micro.magnet.fsu.edu/primer/digitalimaging/cmosimagesensors.html, visited Nov. 9, 2004, 12 pages.

International Preliminary Report on Patentability, International Application No. PCT/US2005/043977, dated Jun. 5, 2007, 4 pages.

* cited by examiner

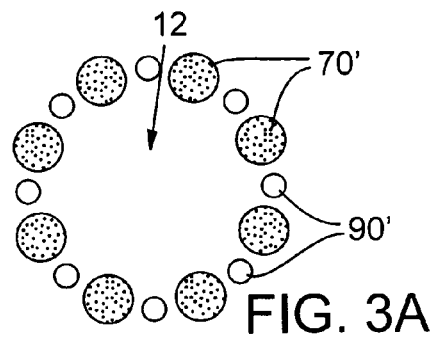
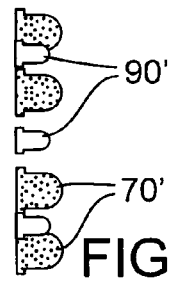
FIG. 3A  FIG. 3B
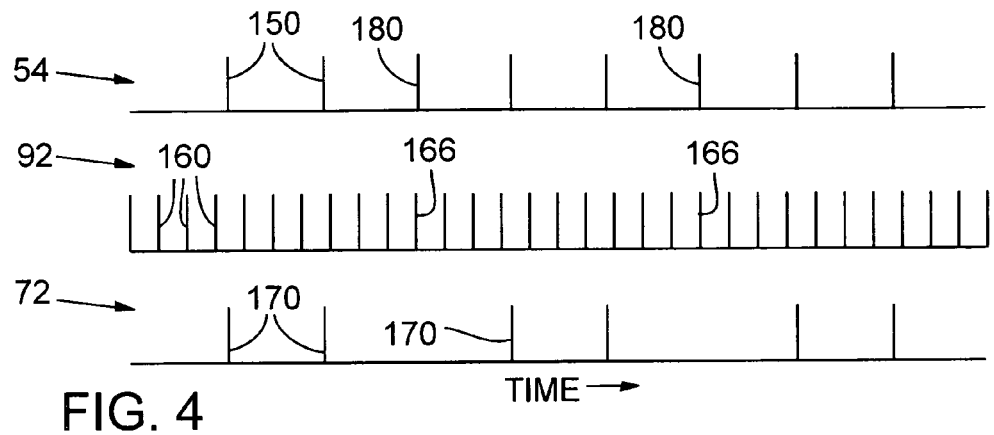
FIG. 4
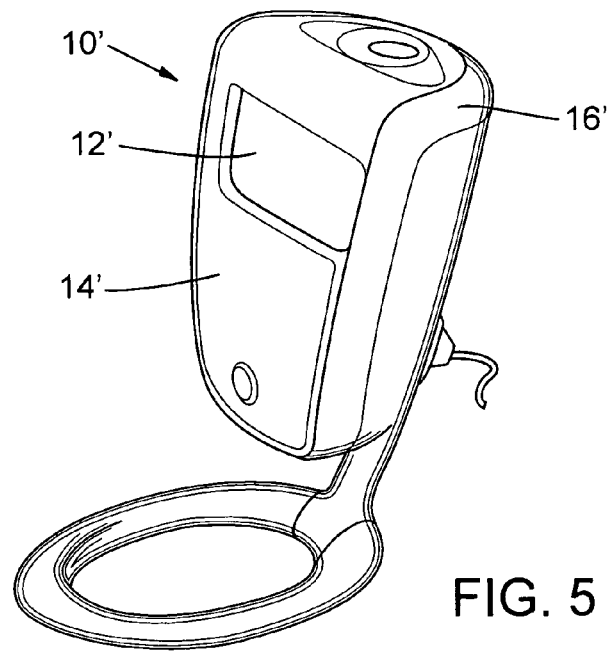
FIG. 5

TRIGGERING ILLUMINATION FOR A DATA READER

RELATED APPLICATION

This application claims the benefit under 35 U.S.C. § 119 (e) of U.S. provisional patent application No. 60/632,696, filed Dec. 1, 2004, which is incorporated herein by reference in its entirety.

TECHNICAL FIELD

The field of this disclosure relates to data readers such as optical code reading devices and, in particular, to methods and devices for triggering illumination for a data reader.

BACKGROUND

Optical codes typically comprise a pattern of dark elements and light spaces. There are various types of optical codes, including 1-D codes (such as UPC and EAN/JAN barcodes) and 2-D codes (such as PDF-417 and Maxicode). For convenience, some embodiments are described herein with reference to 1-D barcodes. However, the embodiments may also be useful for other optical codes and symbols, and nothing herein should be construed as limiting the embodiments to barcodes.

A conventional barcode label comprises a series of parallel dark bars of varying widths with intervening light spaces, also of varying widths. The information encoded in the barcode is represented by the specific sequence of bar and space widths, the precise nature of this representation depending on which particular barcode symbology is in use. Typical methods for reading barcodes comprise generation of an electrical signal wherein a signal voltage alternates between two preset voltage levels, one representing a dark bar and the other representing a light space. The temporal widths of these alternating pulses of high and low voltage levels correspond to the spatial widths of the bars and spaces. It is this temporal sequence of alternating voltage pulses of varying widths that is presented to an electronic decoding apparatus for decoding.

One common type of data reader is flying spot scanner, in which a beam of light is moved (i.e. scanned) across the optical code while a photodetector monitors the reflected or backscattered light. For example, the photodetector may generate a high voltage when a large amount of light scattered from the optical code impinges on the detector, as from a light area of the optical code, and likewise may produce a low voltage when a small amount of light scattered from the optical code impinges on the photodetector, as from a dark area or bar of the optical code. The beam of light in spot scanners is typically a laser, but may comprise a coherent light source (such as a laser or laser diode) or non-coherent light source (such as light emitting diode). A laser may offer advantages of higher intensity illumination, which may allow optical codes to be read over a larger range of distances from the scanner (large depth of field) and under a wider range of background illumination conditions.

The reading spot generated by the illumination source of a scanner may also be manually moved across a barcode—this type of reader being typically referred to as a wand. Alternately, the reading spot may be automatically moved or scanned across the optical code in a controlled pattern. A scan engine may comprise a rotating mirror facet wheel, an oscillating mirror, or other suitable means for repetitively moving the illumination beam. The path of the reading spot created on an object by the moving illumination beam is referred to as a scan line. Typically, an individual scan line must extend across the optical code for the optical code to be successfully read, unless specialized piecing software (known as stitching) or electronics are utilized. In addition to the scan engine, a scanner may also employ a set of scan pattern generating optics to produce a multiplicity of scan lines in various directions from the scanner and at varying orientations, thereby allowing optical codes to be read over a large angular field of view and over a wide range of orientations (i.e., a multidirectional or omnidirectional scan pattern). The scan pattern generating optics typically comprise a set of mirrors aligned at varying angles, each of the mirrors intercepting the illumination beam during a portion of its motion and projecting the beam into the region in front of the scanner. Each mirror or mirror set, in conjunction with the scanning mechanism, produces a scan line at a particular position and at a particular orientation.

One type of data reader is known as a presentation scanner. An example of a presentation scanner with a handheld capability is described in U.S. Pat. No. 6,575,368, which is incorporated herein by reference. Presentation scanners are useful for scanning in environments that have limited counter space, such as convenience stores. As compared to sweep scanners, which may rely in part on movement of an optical code through a scan volume, presentation scanners are designed to read an optical code of an item held relatively stationary in the scan volume. Presentation scanners are also typically easier to set up than sweep scanners of the type commonly used in supermarkets, which are typically installed in the checkout counter. Certain scanners described in the '368 patent allow both fixed and handheld operation, and may provide distinct optical scan patterns or methods for each mode of operation. In the handheld mode of operation, the scanner is moved to the optical code for reading and a single scan line is selectively generated and/or decoded. In the fixed mode of operation, a relatively wide angular field of view is preferred so that an optical code can be read across a large fraction of the surface of a barcoded object. Since objects are often passed through or presented in the scan volume in random orientations, a multidirectional or omnidirectional scan pattern is desirable for efficiently reading the optical code. In addition, a high scan rate is desirable to allow successful reading of optical codes that are quickly passed through the scan volume.

Another type of data reader is an imaging reader, such as a CCD (charge coupled device) reader. Imaging readers can be configured to read both 1-D and 2-D optical codes, as well as other types of optical codes and symbols. When an imaging reader is used to read an optical code, an image of the optical code or portion thereof is focused onto a detector array. An imaging reader may utilize a light source to illuminate the item being scanned, to provide the required signal response in the imaging device. Imaging technology has heretofore primarily been used for machine vision systems, hand-held barcode readers, and document scanners. For the purposes of this description, the term "scanner" may refer to data readers of either the spot scanner type or the imaging reader type, or both.

With the advent of low-cost imagers and high-speed processors, it is now possible to economically implement imaging readers in a presentation scanner. However, the present inventors have recognized that the high-intensity illumination often required for good performance of an imaging reader can be annoying to the user, especially if employed in a presentation scanner. Implementing an imaging reader in a presentation scanner may cause the high-intensity illumination to be emitted in the general direction of a user (e.g., a clerk) or a bystander (e.g., a customer). This high-intensity illumination can be uncomfortable to look at for an extended period of time. Thus, the present inventors have identified a need for reducing the amount of time that a user or bystander is exposed to high-intensity illumination without substantially affecting data reader performance.

SUMMARY

Methods and devices are disclosed for triggering a source of visible light in connection with a data reader, such as an imaging reader, in response to a sensed proximity of an item.

In a preferred configuration, the data reader comprises an imaging reader, such as a CCD or CMOS imager, that is sensitive to both infrared illumination and visible light. The imaging reader may be operable to read a symbol (such as a barcode or other optical code marked on an item) via reflected infrared illumination, reflected visible light, or both. The scan zones for reflected infrared illumination and reflected visible light may be different sizes, but will typically overlap regardless of their respective sizes. When the characteristics of the reflected infrared illumination received by the imaging reader are consistent with the presence or movement of an item in the visible scan zone, the source of visible light may be triggered to illuminate the item, thereby facilitating reading of the symbol using the same imaging reader as is used to sense the presence of the item.

In one embodiment, infrared illumination and visible light are pulsed in alternating succession to allow both sources of illumination to remain active for scanning optical codes using both wavelengths. Successive frame exposures of the imaging reader are illuminated with either a pulse of infrared illumination or visible illumination. Imager frame rates may be high enough to allow multiple exposures of a single optical code using both wavelengths of illumination.

Reflected infrared illumination or other means may also be sensed by the data reader to determine when the item or optical code has been moved out of the scan zone or moved to a position where it would not be readable using visible illumination. In response to the sensed changes in reflected infrared illumination indicating such movement of the item, the visible light source may be turned off.

Additional aspects and advantages will be apparent from the following detailed description of preferred embodiments, which proceeds with reference to the accompanying drawings.

BRIEF DESCRIPTION OF THE DRAWINGS

FIGS. 3A and 3B are respective front and side views of an illumination source layout for an imaging reader, such as the imaging reader of FIG. 1;

FIG. 4 is a timing diagram illustrating frame exposure timing for an imaging reader and pulse timing of a visible illumination source and an infrared illumination source;

FIG. 5 is a front pictorial view of a presentation scanner according to a second embodiment;

DETAILED DESCRIPTION OF PREFERRED EMBODIMENTS

Figure 1:
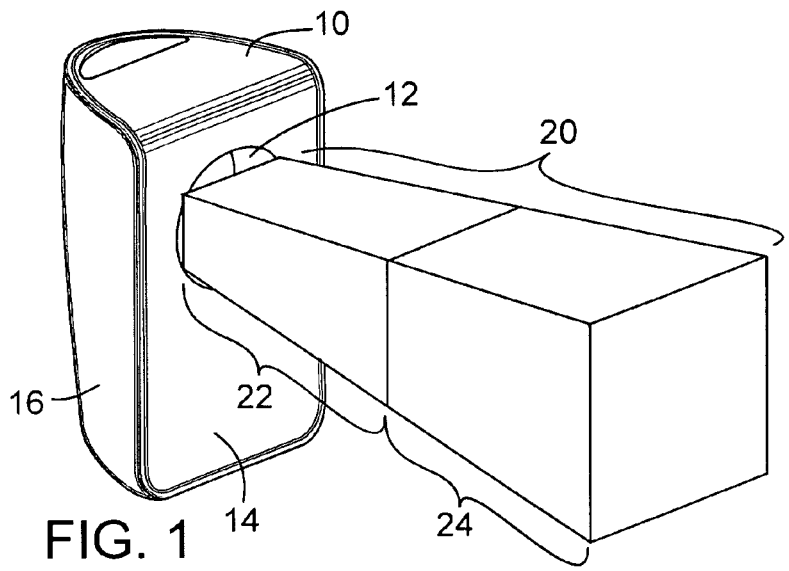
FIG. 1 is a pictorial view of a presentation scanner according to a first embodiment of an imaging reader, with scan zones illustrated.

Throughout the specification, reference to "one embodiment," or "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment. Furthermore, the described features, structures, or characteristics may be combined in any suitable manner in one or more embodiments.

Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

In a preferred embodiment, at least a substantial portion of a scan zone of a data reader is illuminated with infrared illumination. When an item is placed in the scan zone, the item reflects a portion of the infrared illumination, which can be sensed by the data reader to indicate the presence of the item in the scan zone. In response to receipt of the reflected infrared illumination at the data reader, a source of visible light is triggered to thereby visibly illuminate the item for reading via the data reader or for other purposes. The device and its method of operation may require the reflected infrared illumination received at the data reader to exceed a threshold intensity before the source of visible light is triggered. The threshold may be preset, adjustably preselected, or automatically adjusted, to prevent premature or unwanted triggering of visible light, such as when the item is outside of a visible illumination zone of the data reader or visible scanning portion of the scan zone.

In some embodiments, before the source of visible light is triggered, the data reader may utilize the reflected infrared illumination to read a barcode, optical code, or other symbol located on the item. If the symbol is successfully read via the reflected infrared illumination, the visible light source may be triggered to provide visual feedback to the user. Similarly, the visible light source may be triggered when the data reader has failed to read the symbol via the reflected infrared illumination. Visible light may be generated in a distinctive pattern or sequence of brief flashes to thereby indicate whether the data reader has failed or succeeded in reading the symbol via the reflected infrared illumination or otherwise.

The data reader may also determine a range to the item, based on the intensity characteristics of the reflected infrared illumination received at the data reader. A ranging feature may be useful when the infrared illumination zone extends farther from the data reader than the visible scan zone. When the item is moved out of the visible scan zone, a change in the reflected infrared illumination may be sensed to trigger deactivation of the visible light source or to prevent the visible light source from being triggered in the first instance. Methods and devices according to the embodiments described are particularly useful for presentation scanners utilizing imaging technology. The foregoing features and others are described below with respect to various embodiments depicted in the drawings.

In accordance with a first embodiment, FIG. 1 depicts a data reader comprising a presentation scanner 10 suitable for reading barcodes and/or other optical codes and/or symbols. Presentation scanner 10 is sized for placement, in an exemplary environment of use, on a checkout counter and typically along a side perimeter thereof. Presentation scanner 10 preferably includes an imaging reader 54 (FIG. 2) that receives illumination via an aperture 12 located on a front face 14 of the scanner 10. Aperture 12 may be located elsewhere in other embodiments. The aperture 12 also allows illumination generated internally of the scanner housing 16 to be emitted or projected from the scanner 10 into a scan zone 20 of the scanner 10. The emitted illumination may comprise infrared illumination, high-intensity visible light, or both. Thus, as used herein, the term "illumination" is not limited to the visible spectrum, but also includes infrared radiation and possibly other nonvisible radiation, particularly electromagnetic radiation in wavelengths that can be sensed by imaging reader 54. Scan zone 20 may comprise a visible light scan zone 22, within which an item illuminated with visible light is generally readable by imaging reader 54. An infrared scan zone may be coextensive with scan zone 20, and typically overlaps with visible light scan zone 22. The infrared scan zone may also extend from scanner 10 farther than visible light scan zone 22, in an extended scan zone 24, to allow long-range reading capabilities via reflected infrared illumination.

Figure 2:
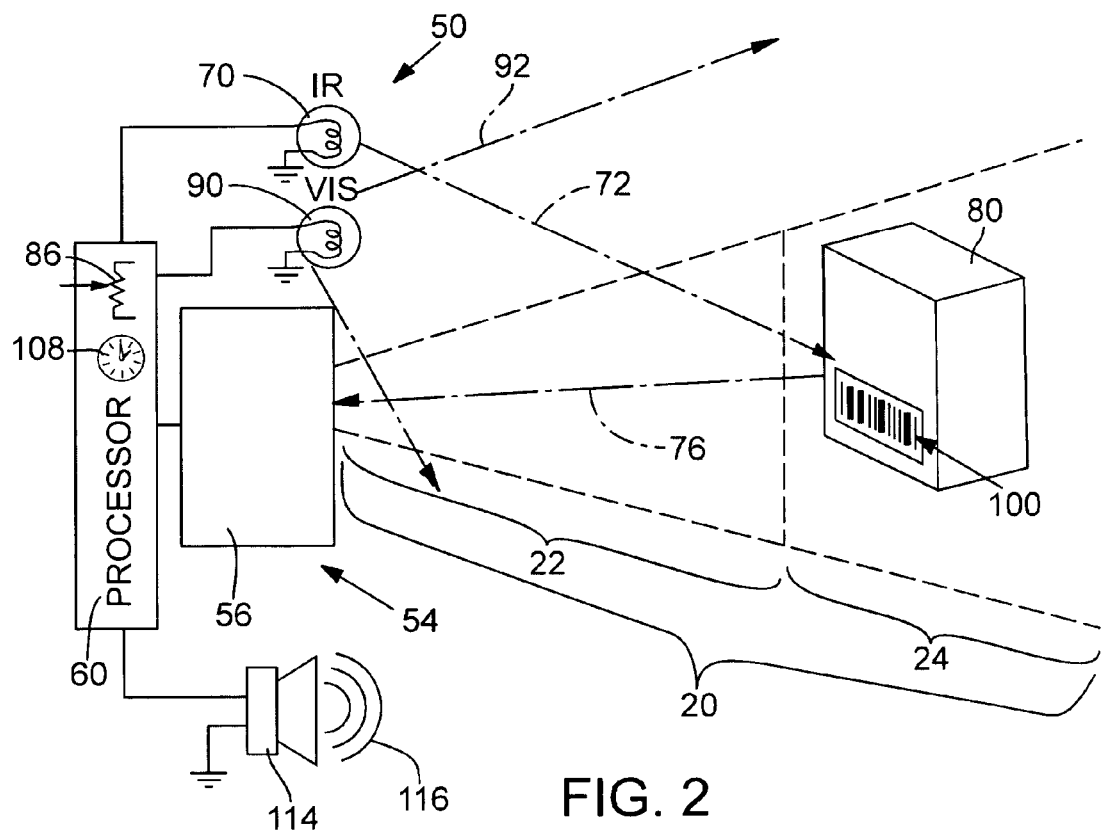
FIG. 2 is a schematic of an imaging-type data reader, such as the presentation scanner of FIG. 1.

FIG. 2 is a schematic diagram of an imaging-type data reader 50, such as the presentation scanner 10 of FIG. 1. For convenience, the scan zone 20, visible scan zone 22, and extended scan zone 24 are commonly numbered in FIGS. 1 and 2. However, the scan zones may differ from one type of scanner to the next, and the common numbering should not be construed as limiting the scope of the embodiments described.

With reference to FIG. 2, data reader 50 preferably includes an imaging reader 54, such as a complementary metal oxide semiconductor (CMOS) imager 56. CMOS imager 56 is coupled to a processor 60 for reading optical codes and other symbols. CMOS imager 56 has a field of view inclusive of scan zone 20, within which an image of a target item may be presented for imaging. CMOS imager 56 may comprise an active-pixel imaging sensor with a global shutter (simultaneous total-pixel exposure system—also referred to as "frame shutter exposure") and good near infrared (NIR) sensitivity, such as a model MT9V022 sensor sold by Micron Technology, Inc. of Boise, Id., USA. In some embodiments, multiple CMOS imagers 56 may be employed for reading items in multiple different scan volumes, which volumes may overlap, as described below with reference to FIGS. 8-12.

Processor 60 may comprise any suitable digital processor, such as a low-power DSP core or ARM core processor. In preferred embodiments, processor 60 comprises an OMAP processor sold by Texas Instruments of Dallas, Tex., USA or an i.MX1 series processor (such as the MC9328MX1 processor) sold by Freescale Semiconductor, Inc. of Austin, Tex., USA.

In other embodiments (not shown), data reader 50 may comprise other types of data readers, such as a moving spot laser scanner, for example. Data reader 50 may also comprise a dual-mode scanner, such as the kind described in U.S. Pat. No. 6,575,368, incorporated herein by reference.

Turning again to FIG. 2, a source of infrared illumination 70 is provided for illuminating scan zone 20. Infrared source 70 preferably comprises a collection of infrared light emitting diodes (LEDs), but may alternatively comprise another kind of infrared light source, such as a lamp or laser diode, for example. Infrared source 70 preferably emits diffuse infrared radiation at a near-infrared wavelength of about 850 nm, although non diffuse sources and sources of other wavelengths in the infrared spectrum may also be used. Infrared source 70 may be coupled to and controlled by processor 60, or may be remotely mounted and powered. A power supply circuit (not shown) is preferably provided for energizing infrared source 70. In a preferred embodiment, infrared source 70 remains active during operation of data reader 50, regardless of whether visible illumination source 90 is active. In an alternative embodiment, infrared source 70 may be turned off whenever data reader 50 is operating in a visible light scanning mode. When infrared source 70 and visible illumination source 90 are both active, they are preferably both pulsed in alternating succession or at suitable rates and/or times to avoid simultaneous emission of visible 92 and infrared 72 illumination during a single exposure frame of the imaging reader 54.

Infrared source 70 is preferably located so that infrared illumination 72 projected from infrared source 70 will be reflected toward CMOS imager 56 in the form of reflected infrared illumination 76 by an object or item 80 placed in scan zone 20. Reflected infrared illumination 76 and/or reflected visible illumination (from either ambient sources or from visible illumination source 90) is received at and sensed by CMOS imager 56, to detect the presence of item 80 in scan zone 20. For example, an increase in the intensity of reflected infrared illumination received by CMOS imager 56 may indicate the presence of an item or object 80 in scan zone 20. Conversely, a decrease in the reflected infrared illumination 76 may indicate that item 80 has been moved out of scan zone 20.

Data reader 50 may include a setpoint 86 for an intensity threshold that must be exceeded by the received reflected infrared illumination 76 before the processor 60 will allow a source of visible light 90 to be triggered (as described below). Setpoint 86 may be established in a hard-wired circuit or may be programmed in software operating on processor 60. The mean, median, or cumulative pixel intensity read from CMOS imager 56 may be compared to setpoint 86 to determine whether the intensity threshold has been exceeded. Setpoint 86 may be selectively adjustable and, in some embodiments, may be automatically dynamically adjusted in response to environmental changes over time. In one embodiment, a pixel intensity histogram generated onboard CMOS imager 56 or in processor 60 may be analyzed (either onboard CMOS imager 56 or by processor 60) to determine whether, in the latest frame of CMOS imager 56, greater than a preselected number or a preselected percentage of the total pixels sensed infrared illumination in excess of a minimum threshold intensity value or setpoint 86. For example, visible light 90 may be triggered when more than 10% of the total pixels sense infrared illumination in excess of a preselected threshold intensity of approximately 80% of the saturation intensity.

Characteristics of the reflected infrared illumination other than its overall cumulative, mean, or median intensity may also be sensed by CMOS imager 56 in determining the presence or absence of an item 80 in scan zone 20. For example, to detect movement in the field of view, processor 60 may calculate cumulative absolute differences in pixel intensity over time throughout the pixel array of CMOS imager 56 or in a portion thereof, such as a window of the pixel array or a virtual scan line. Also, an automatic exposure setting of the CMOS imager 56, which is updated automatically based on received illumination intensity, may be monitored by processor 60 to detect the presence of item 80 in scan zone 20—the shorter the exposure time, the closer the item, and vice versa. Accordingly, setpoint 86 may establish a threshold for indicators of proximity other than absolute intensity.

In some alternative embodiments, infrared source 70 may be omitted and the presence or absence of item 80 may be detected via changes in sensed ambient visible light, as reflected by item 80. In still other alternative embodiments, non-imaging proximity sensors, such as passive infrared (PIR) sensors or sonar (not shown) for example, may be used to detect the presence or absence of item 80 in scan zone 20.

After an item 80 is detected in scan zone 20, via sensing and analysis of reflected infrared illumination 76 or otherwise, visible light source 90 may be triggered to illuminate the item 80 or for other purposes. In one embodiment, visible light source 90 will not be triggered until after an attempt has first been made to read an optical code or other symbol 100 borne by item 80. For example, imaging reader 54 may attempt to read an image of infrared illumination reflected by symbol 100. In the event that symbol 100 is successfully read, it may be unnecessary to activate visible light source 90 to facilitate reading of the symbol 100. However, visible light source 90 may nevertheless be triggered briefly to provide visual feedback to the user upon a successful attempt to read the symbol 100 via the reflected infrared illumination 76. In another embodiment, visible light source 90 is triggered immediately after data reader 50 detects the presence of an object in scan zone 20 via changes in the reflected infrared illumination 76 or otherwise. In still other embodiments, visible light source 90 is triggered after a slight delay, as determined by a timer 108 of processor 60 that is activated upon sensing the presence of item 80 in scan zone 20. For example, the processor 60 may delay activation of visible light source 90 for a predetermined period of between a few milliseconds (msec) and a few seconds (e.g. between 10 msec and 2 seconds) after item 80 is detected in scan zone 20. The length of the delay may be equivalent to a timeout period for attempting to read symbol 100 via reflected infrared illumination 76, or may be shorter if data reader 50 is not configured to attempt to read symbol 100 via reflected infrared illumination 76.

In a preferred embodiment, visible light source 90 may comprise one or more amber LEDs 90' (FIGS. 3A and 3B) emitting visible light 92 at a wavelength of approximately 610 nm and/or one or more red LEDs (not shown) emitting visible light at a wavelength of approximately 640 nm. Alternatively, visible light source may comprise any other source of noncoherent visible light, such as a lamp, or a source of coherent visible light, such as a laser or laser diode. Visible light source 90 should typically be positioned and/or directed to illuminate at least visible scan zone 22. In some embodiments, visible light source 90 and infrared source 70 may be combined in a common lamp structure.

FIGS. 3A and 3B are respective front and side views of an illumination source layout for an imaging reader, such as the imaging reader of FIG. 1. With reference to FIGS. 3A and 3B, multiple amber LEDs 90' and multiple infrared LEDs 70' are spaced apart around the perimeter of the aperture 12 of scanner 10. Infrared and amber LEDs 70' and 90' may be alternated in a circular configuration to help provide a substantially uniform distribution of both types of illumination across scan zone 20 and visible scan zone 22, respectively. Amber LEDs 90' may be driven in series to ensure uniform power input and illumination output across all of the amber LEDs 90'. Similarly, infrared LEDs 70' may be driven in series, which may preferably be powered in a separate series or by a separate power supply from amber LEDs 90'.

To provide a bright image during exposure of the imaging reader 54 and to assist in reading optical codes at high sweep speeds, LEDs 70', 90' are preferably pulsed briefly (short pulse width) at high power. For example, infrared LEDs 70' may be pulsed for 260 µs (microseconds) or less at a current of approximately 500 mA; and amber LEDs 90' may be pulsed for 650 µs or less and more preferably for 250 µs or less at a current of approximately 140 mA. The preferred frequencies of the illumination pulses are described below with reference to FIG. 4. The pulse width of the infrared LEDs 70' may be adjusted to compensate for scene brightness or reflectance changes. However, because adjustments to the pulse width of amber LEDs 90' may be noticed by users or bystanders, it is preferable to instead adjust the exposure time of imager 56 to adjust for visible brightness or reflectance changes. Changing the exposure time may affect frame rates, but the number of blanking rows may be changed in the imager to compensate therefor.

FIG. 4 is an timing diagram in accordance with one embodiment illustrating frame exposures 150 of imaging reader 54 (FIG. 2), pulses 160 of visible light 92 emitted by visible illumination source 90, and pulses 170 of infrared radiation 72 emitted by infrared source 70. With reference to FIG. 3, visible illumination source 90 is pulsed at a frequency sufficient to prevent a flashing sensation by most users (typically 50-60 Hz or greater). In the embodiment shown, pulses 160 of visible light 92 are emitted at a frequency of 66.7 Hz so that an imaged visible pulse 166 coincides with every third frame 180 of the imaging reader 54, which is set to expose 20 frames per second (20 Hz). Infrared radiation 72, which is not visible and will not impart a flashing sensation, may be pulsed at a rate slower than visible source 90. In this example, pulses 170 of infrared radiation 72 are emitted to coincide with the exposure period of each frame except for every third frame 180 when visible illumination pulses 160 are emitted.

Pulses from visible source 90 and infrared source 70 may be timed by imaging reader 54 and/or processor 60. For example, the timing of the pulses 160, 170 of visible and infrared illumination may be synchronized by synchronization signals output by imaging reader 54 to ensure that the pulses 166, 170 coincide with the frame exposures 150. Alternatively, the timing of the exposure frames 150 of imaging reader 54, the pulses 160 of visible source 90, and the pulses 170 of infrared source 70 may all be set by control signals output by processor 60. Illumination pulsing of infrared and visible illumination sources is further described in U.S. patent application Ser. No. 11/045,817, filed Jan. 28, 2005, which is incorporated herein by reference.

Imaging reader 54 may include a generalized axicon lens 190 (FIGS. 6-8) for providing a soft focus of image at or about CMOS imager 56. Axicon lens 190 preferably includes a plano-concave lens of crown glass (such as BK7) in front of a plano-convex lens of flint glass (such as SF11 or LASFN30). Choosing glass lens materials with high dispersive properties causes axicon lens 190 to have a significantly different focal length for different wavelengths, due to chromatic aberration. By utilizing both visible and infrared illumination and dispersive lens materials, imaging reader 54 can achieve good depth of field and good resolution with a simple lens design. Because infrared illumination 72 is invisible to the user, its power may be increased to provide improved far-field illumination at the imager frame rate by increasing the power of the infrared illumination 72. And because infrared illumination 72 is invisible to the user, the improved illumination at far-field ranges will not annoy a bystander or user of data reader 50. If axicon lens 190 is focused mid-field or far-field (into extended scan zone 24) for infrared illumination 72, wavelength-based focus shift of axicon lens 190 may cause visible illumination 92 to be focused for near-field illumination (within visible scan zone 22). The field of view may be smaller in the near-field 22, which may allow visible illumination 92 to be emitted at lower luminous power, thereby reducing electrical power consumption and user annoyance. Furthermore, utilizing both visible and infrared illumination may allow reading of a greater variety of optical codes and surfaces than possible with only one type of illumination. For example, some barcode labels, such as thermally printed labels, have little or no contrast in the infrared spectrum at around 850 nm, while having good contrast in the visible spectrum at around 590 nm.

Advantageously, visible light source 90 may remain inactive until needed for imaging purposes or otherwise. However, in some modes of operation, visible light source 90 may remain active until deactivated upon a triggering event. In preferred embodiments, as described herein, visible light source 90 may be triggered after detection of an item 80 in scan zone 20 (and preferably in visible scan zone 22, as described below) to illuminate scan zone 20 and thereby facilitate reading of symbol 100 by imaging reader 54. Timer 108 may be employed to activate visible light source 90 for a minimum duration, which may be preset or dynamically adjusted based on scanning performance. Activating visible light source 90 for a minimum duration—even if item 80 is moved out of scan zone 20 after light source 90 is triggered—facilitates more consistent operation of data reader 50 and avoids presenting confusing visual cues to the user.

Visible light source 90 may be turned off in response to sensing movement or an absence of item 80 from visible scan zone 22. Changes in reflected infrared 76 may be sensed by imaging reader 54 to determine when item 80 is removed from visible scan zone 22 or moved such that no optical code would be readable. For example, a flat item having an optically coded major surface would be unreadable if the major surface is turned at a right angle to the optical axis of the imaging reader 54, i.e. facing to the side, with the edge of the flat item facing imaging reader 54. Changes in reflected infrared 76 may indicate that a flat item has been turned or moved so that it is unreadable with visible illumination, in which case processor 60 may turn off visible illumination source 90. To sense changes in reflected infrared 76, processor 60 may monitor an automatic exposure setting of CMOS imager 56. When an item 80 is moved out of the field of view or turned to minimize its viewed surface area, the amount of reflected infrared 76 is reduced and CMOS imager 56 may automatically change an exposure setting in response. By monitoring this automatic exposure setting, processor 60 can sense when an object is either moved out of the field of view or positioned such that symbol 100 would be unreadable with visible illumination, and thereafter deactivate or disable visible light source 90. However, imaging reader 54 may continue thereafter to attempt reading an optical code or symbol 100 and may also continue to monitor the position and range of item 80 to determine when visible light source 90 should be triggered.

In some embodiments, data reader 50 may perform a ranging function to determine the range from the data reader 50 to item 80. For example, imaging reader 54 may derive range information from the intensity of the reflected infrared illumination. The size of the object that is reflecting the infrared illumination may also be taken into account in deriving range to the item 80. With ranging capabilities, data reader 50 may be operable to trigger visible light source 90 only when item 80 is detected within visible scan zone 22.

An audio speaker 114 or other sound generating device may be coupled to processor 60 to produce an audible tone 116 or other audible feedback upon successfully reading symbol 100, whether via reflected infrared illumination 76, reflected visible light, or otherwise.

Figures 6, 7:
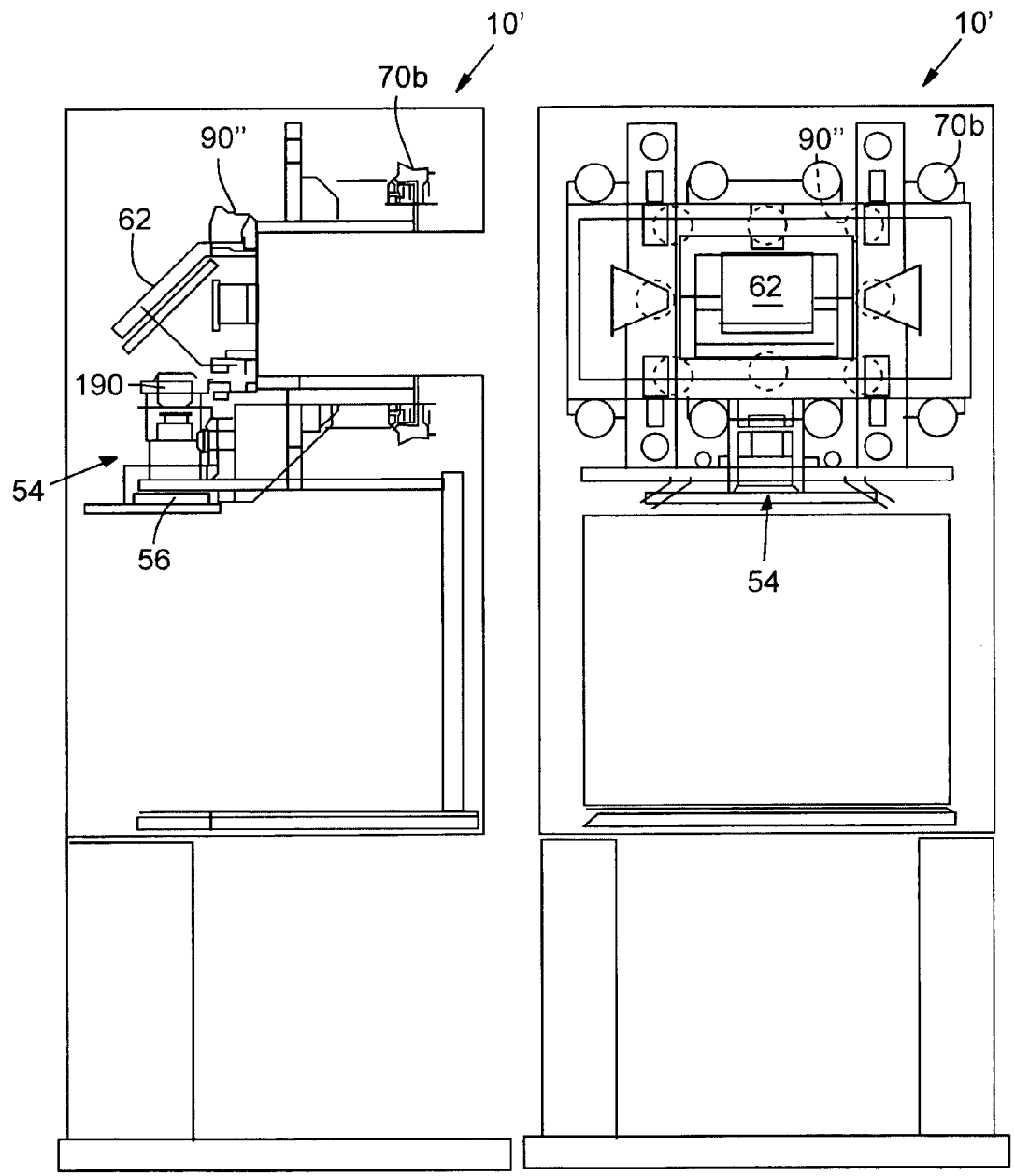
FIG. 6 a schematic left side mechanical layout of the scanner of FIG. 5.
FIG. 7 is a schematic front elevation view of the mechanical layout of FIG. 6.
Figure 8:
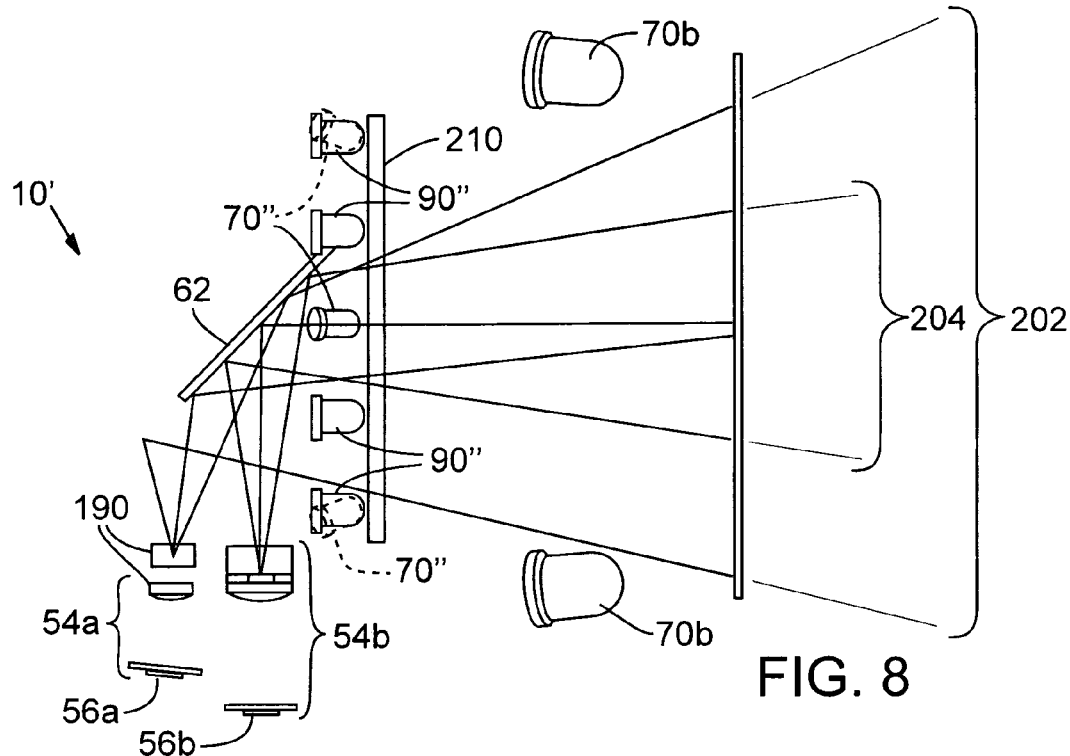
FIGS. 8 and 9 are respective left side and front elevation schematic views showing positioning of illumination sources and dual imagers of the scanner of FIG. 5.
Figure 9:
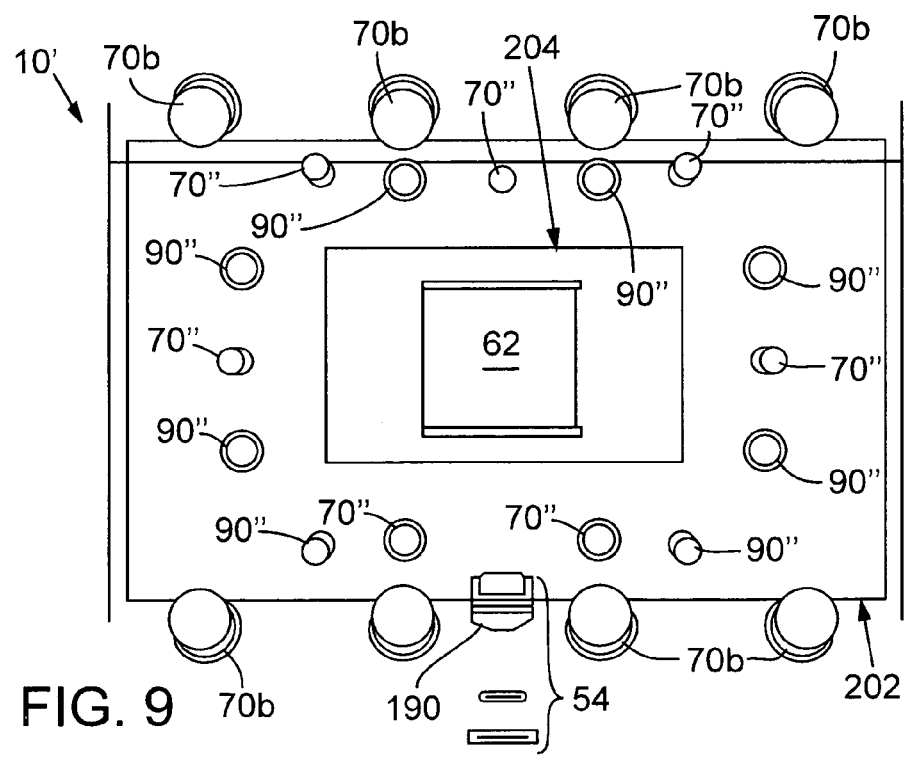
Figure 10:
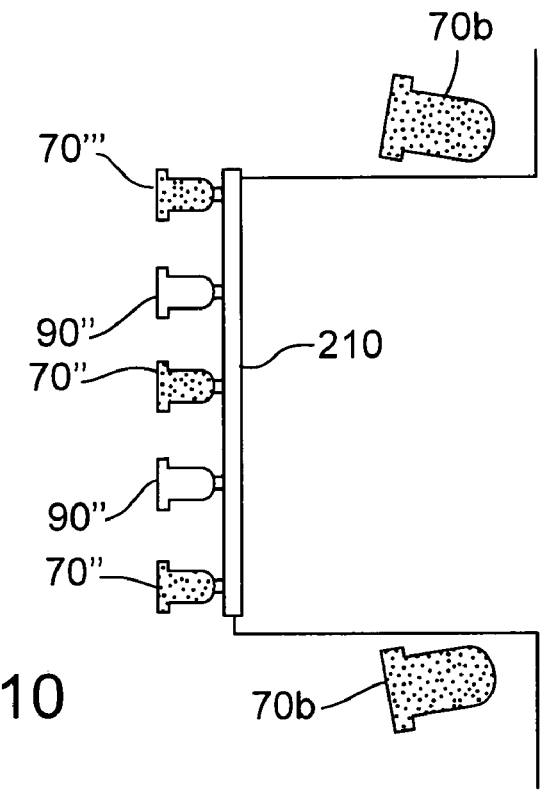
FIGS. 10 and 11 are respective left side and front elevation views of an LED layout of the scanner of FIG. 5.
Figure 11:
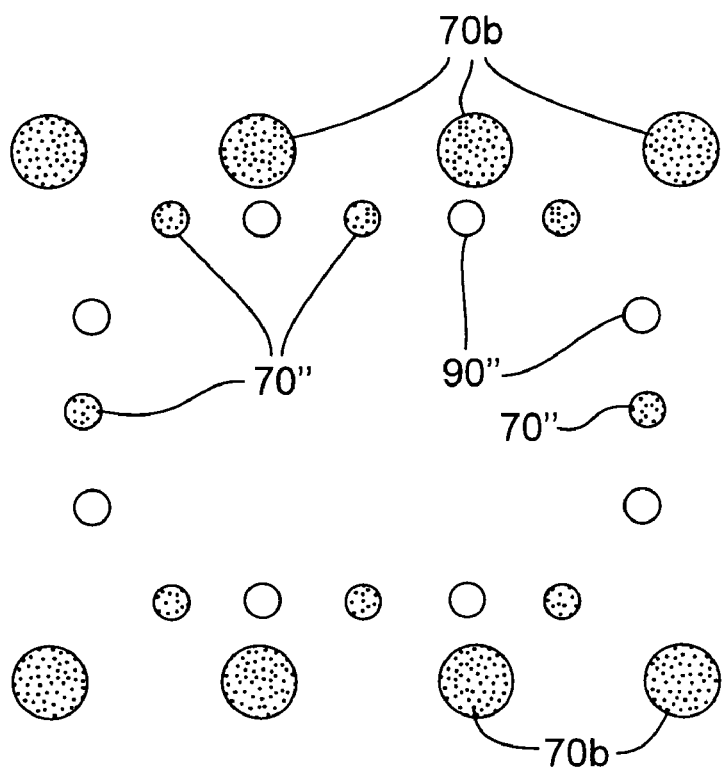
Figure 12:
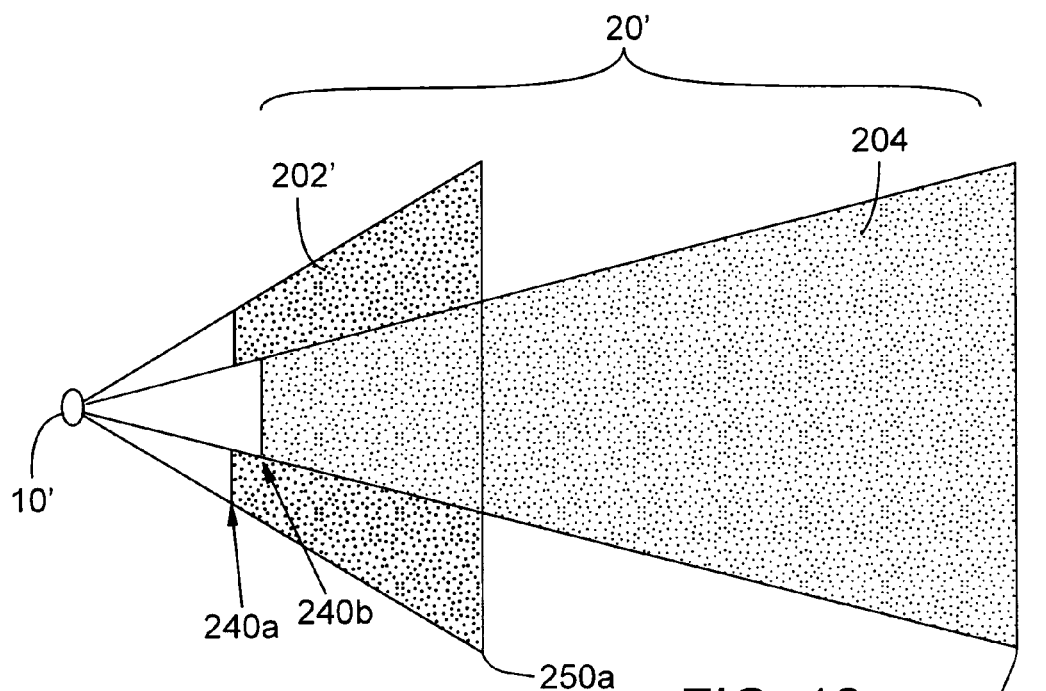
FIG. 12 is a left side view of overlapping near-field (widefield) and far-field (narrow-field) scan zones of the scanner of FIG. 5.
Figure 13:
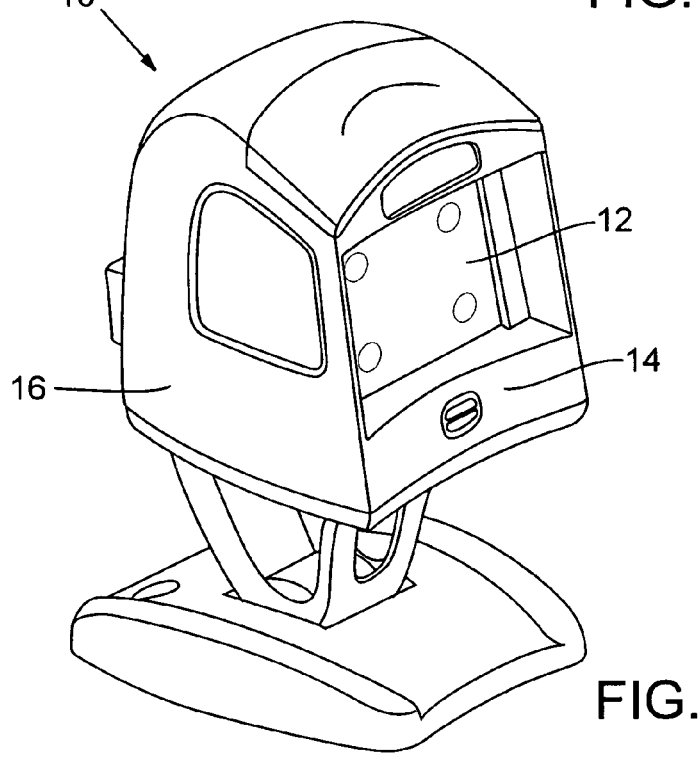
FIG. 13 is a front-left-top pictorial view of a scanner according to a third embodiment.
Figure 14:
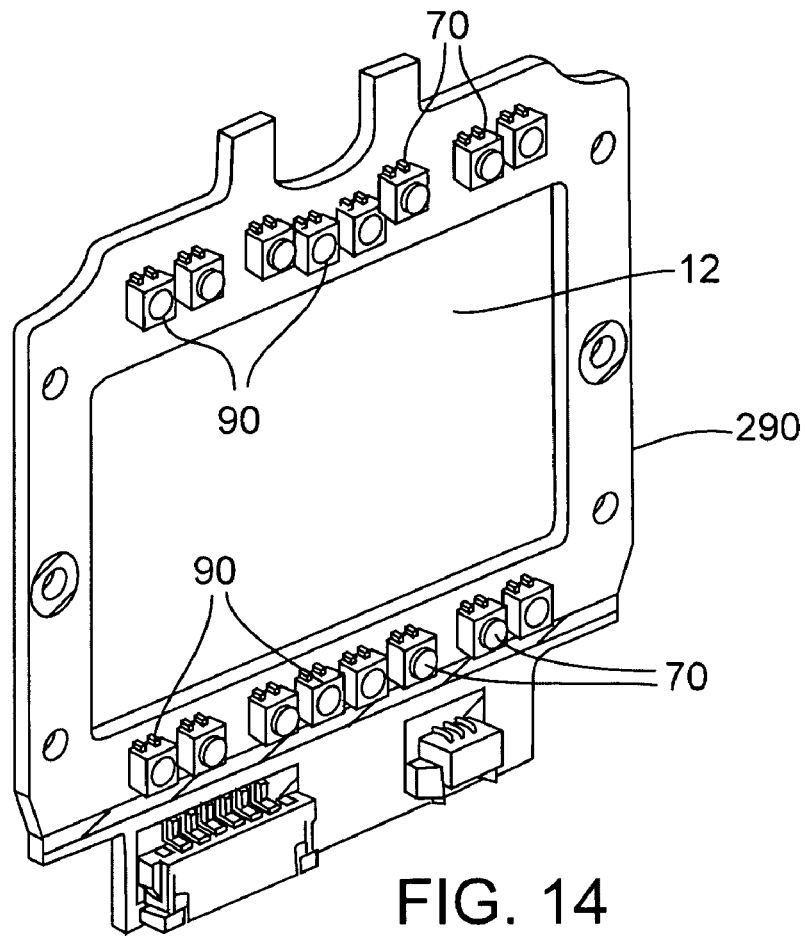
FIG. 14 is an isometric view of an illumination source layout for the scanner of FIG. 13, including a circuit board on which the illumination sources are supported.

FIG. 5 is a front perspective view of a presentation scanner 10' in accordance with another embodiment including dual overlapping fields of view (e.g. dual scan zones or scan volumes) for enhanced scanning capabilities. FIGS. 6 and 7 are respective left side and front schematic views of a mechanical layout of scanner 10' showing dual overlapping fields of view—e.g., wide field 202 (near-field) and narrow field 204 (mid-field and far-field). FIGS. 8 and 9 are respective left side and front elevation schematic views showing positioning of illumination sources 70" and 90" and dual imaging readers 54a and 54b of scanner 10'. FIGS. 10 and 11 are respective left side and front elevation views of an LED layout of scanner 10' of FIGS. 6-9. And FIG. 12 is a left side view of overlapping wide-field 202 (near-field) and narrow-field 204 (far-field) scan zones of scanner 10'. With reference to FIGS. 5-11, reference numbers that are similar to embodiments of FIGS. 1-4 denote similar components.

As shown in FIGS. 8 and 10, LEDs 70" and 90" are preferably positioned to touch the surface of glass window 210, which may reduce internal reflections that can interfere with imaging. A set of narrow-field (far-field) infrared LEDs 70b are provided for illuminating at far-field and mid-field ranges. These far-field infrared LEDs 70b may operate at a higher power than near-field infrared LEDs 70" and visible LEDs 90". Additional infrared LEDs may provide improved coverage of dual scan zones and improved item sensing and ranging capabilities over a scanner that includes only one set of LEDs for the entire scan zone. LEDs 70", 90", and 70b may be arranged in a rectangular configuration to illuminate a letter-box shaped field of view, compatible with the shape of imaging readers 54a and 54b, thereby maximizing the field of view of scanner 10'. Wide-field imaging reader 54a and associated lenses 190 are preferably configured to provide a field of view having a cross sectional area at a near focus distance 240a (FIG. 12) thereof that is substantially wider and taller than the cross sectional area of the field of view of narrow-field imaging reader 54b at its near focus distance 240b. A wide and tall field of view facilitates imaging of an entire optical code as it is moved through scan zone 20'. As narrow-field 204 extends beyond the effective maximum focusing distance 250a of wide-field 202, the width of narrow field 204 increases to a more usable width. The maximum focusing distance 250b of narrow field 204 enhances long range scanning capabilities and triggering capabilities utilizing infrared illumination. A fold mirror 62 is included to facilitate compact arrangement of imaging readers 54a, 54b and other components of scanner 10'.

Figure 15:
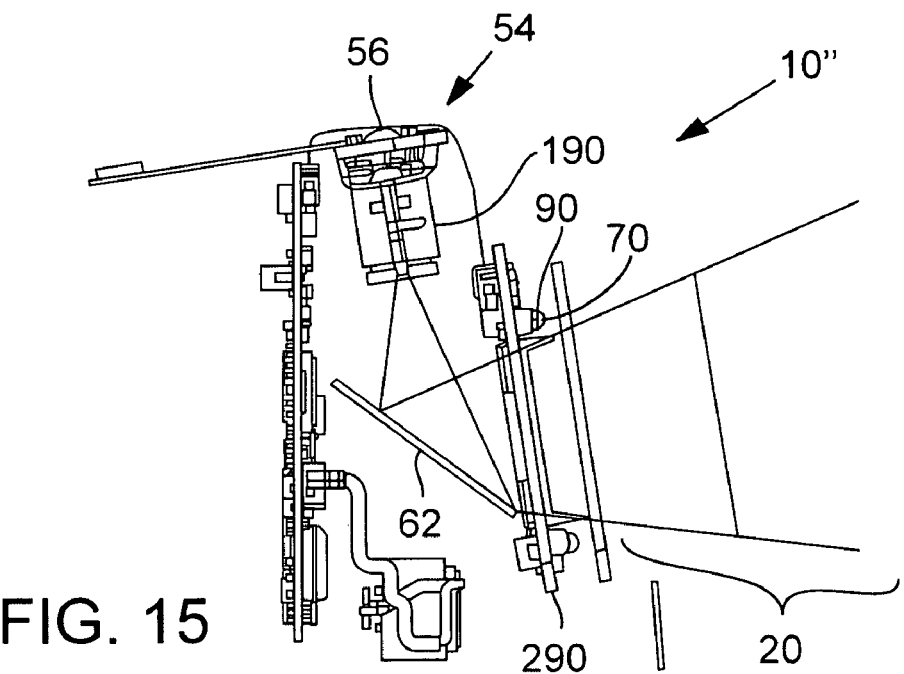
FIG. 15 is a side elevation view of the scanner of FIG. 13 with a housing thereof omitted to show a mechanical layout of the scanner.
Figure 16:
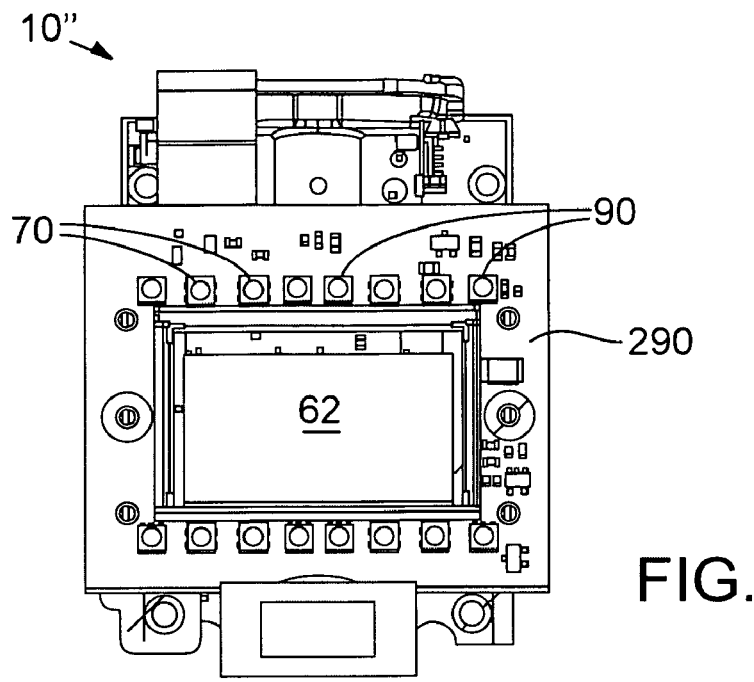
FIG. 16 is a front elevation view of the mechanical layout of FIG. 15.
Figure 17:
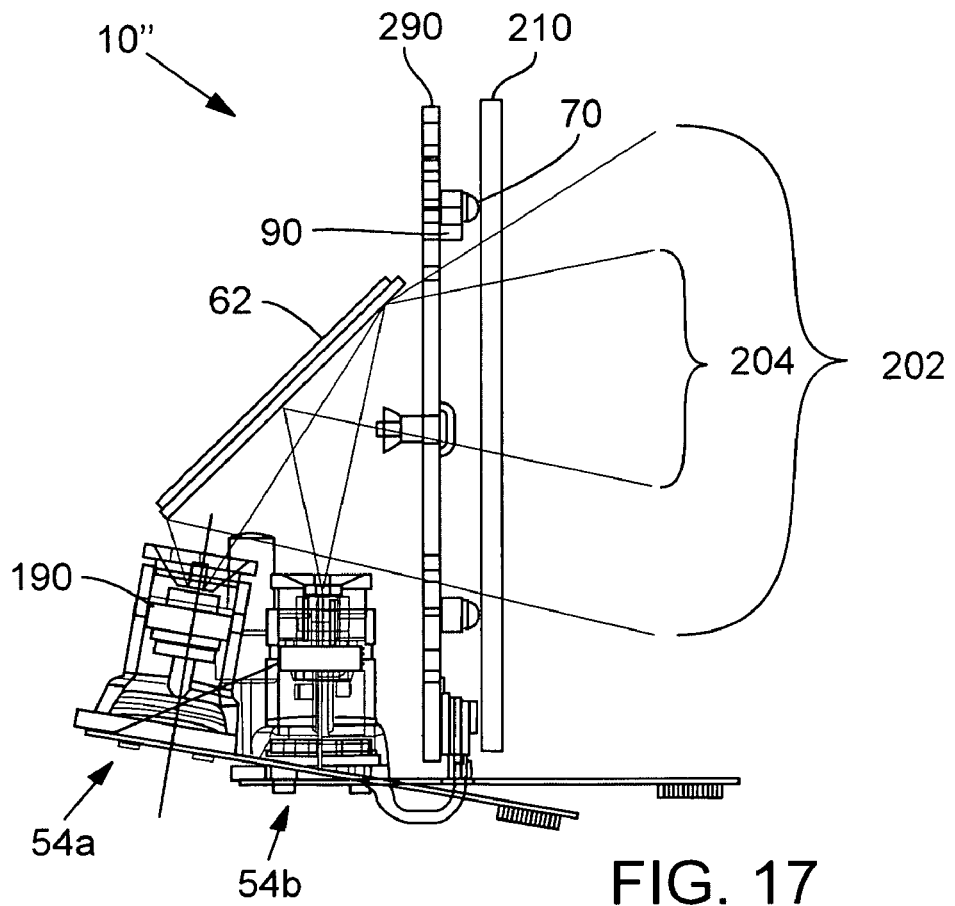
FIG. 17 is a schematic left side elevation view of an alternative embodiment of the scanner of FIG. 13, including dual imaging readers.
Figure 18:
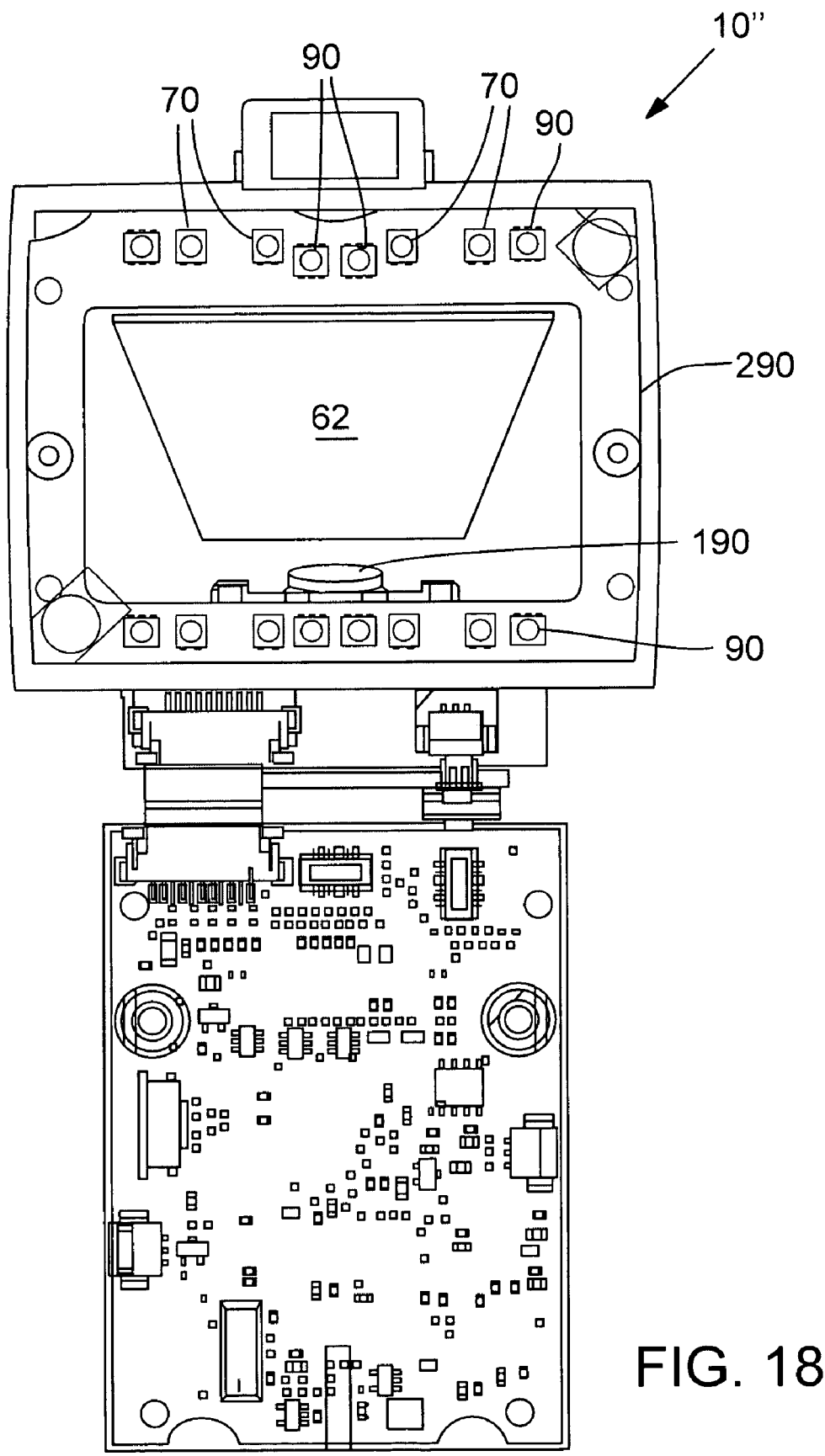
FIG. 18 is an unfolded view of the components of the scanner shown in FIGS. 15-16.

FIGS. 13-18 depict yet another embodiment of a reader 10", in which reference numbers similar or identical to those in FIGS. 1-11 denote similar features. For example, in FIG. 14, a pictorial layout illustrates visible and infrared illumination sources 70, 90 supported on a circuit board 290 that frames an aperture 12 of reader 10". In FIG. 15, an imaging reader 54 including an imager 56 are supported in an inverted orientation as compared to the arrangement of the embodiments of FIGS. 5-11. FIG. 15 illustrates a fold mirror 62 that directs received illumination upwardly toward imaging reader 54. FIG. 17 illustrates an embodiment of reader 10" including two imaging readers 54a and 54b, for respective wide and narrow fields of view. And FIG. 18 shows an unfolded layout of circuit boards, flex circuits and other components of reader 10".

It will be obvious to those having skill in the art that many changes may be made to the details of the above-described embodiments without departing from the underlying principles of the invention. The scope of the present invention should, therefore, be determined only by the following claims.

The invention claimed is:

1. A method of triggering a source of visible light for a data reader including an imaging reader having a scan zone, comprising:
    illuminating at least a substantial portion of the scan zone with infrared illumination;
    placing in the scan zone an item bearing an optical code symbol containing encoded data therein, thereby reflecting at least a portion of the infrared illumination as reflected infrared illumination;
    sensing the reflected infrared illumination via the imaging reader;
    attempting to read the symbol and acquire the encoded data therein utilizing the sensed reflected infrared illumination;
    in response to sensing the reflected infrared illumination, triggering a source of visible light and illuminating the scan zone with the visible light thereby reflecting at least a portion of the visible light as reflected visible light;
    sensing the reflected visible light via the imaging reader; and
    reading the symbol via the imaging reader utilizing the sensed reflected visible light.

2. The method of claim 1, further comprising after reading the symbol, deactivating the source of visible light.

3. The method of claim 1, further comprising deactivating the infrared illumination when triggering the source of visible light.

4. The method of claim 3, further comprising:
    after reading the symbol, deactivating the source of visible light; and
    upon deactivating the source of visible light, reactivating the infrared illumination.

5. The method of claim 1 wherein the source of visible light is an LED.

6. The method of claim 1 wherein the illuminating with infrared illumination includes activating an infrared LED.

7. The method of claim 1 wherein the infrared illumination and the source of visible illumination are pulsed.

8. The method of claim 1 wherein the triggering of the source of visible light includes activating the source of visible light for at least a preset minimum duration.

9. The method of claim 1 wherein the sensing of the reflected infrared includes sensing an intensity of the reflected infrared illumination in excess of a threshold intensity.

10. The method of claim 9 wherein the threshold intensity comprises a predetermined threshold.

11. The method of claim 9 wherein the threshold intensity comprises a preselected adjustable set point.

12. The method of claim 9 further comprising automatically adjusting the threshold intensity.

13. The method of claim 1 wherein the triggering of the source of visible light includes triggering the source of visible light after a failed attempt to read the symbol via the reflected infrared illumination.

14. The method of claim 1 wherein the triggering of the source of visible light includes triggering the source of visible light in response to successfully reading the symbol via the reflected infrared illumination, thereby providing visual feedback to a user of the data reader.

15. The method of claim 1 wherein the triggering of the source of visible light includes triggering the source of visible light in response to a failure to read the symbol via the reflected infrared illumination, thereby providing visual feedback to a user of the data reader.

16. The method of claim 1 wherein the sensing of the reflected infrared illumination includes sensing an intensity of the reflected infrared illumination and, further comprising:
    determining a range to the item based on the sensed intensity of the reflected infrared illumination.

17. The method of claim 16 wherein the triggering of the source of visible light includes triggering the source of visible light when the range is within a visible illumination scan zone.

18. The method of claim 16, wherein the triggering of the source of visible light includes displaying a distinctive visible illumination pattern or sequence when the range is outside of a visible illumination scan zone, thereby providing visual feedback to a user of the data reader.

19. The method of claim 1 in which the step of placing the item in the scan zone includes placing the item in a visible illumination scan zone of the scan zone, and further comprising:
    moving the item out of a visible illumination scan zone, thereby causing a change in visible illumination reflected by the item; and
    in response to the change in the reflected visible illumination, deactivating the source of visible light.

20. A method of triggering illumination for a data reader including an imaging reader having a scan zone, comprising:
    illuminating at least a substantial portion of the scan zone with infrared illumination;
    placing in the scan zone an item, thereby reflecting at least a portion of the infrared illumination as reflected infrared illumination;
    sensing the reflected infrared illumination via an imaging sensor contained in the imaging reader;
    in response to sensing the reflected infrared illumination, activating a source of visible light, thereby causing the item to reflect at least a portion of the visible light as reflected visible illumination;
    sensing the reflected visible illumination with the imaging sensor;
    moving the item out of the scan zone, thereby causing a change in the reflected visible illumination;
    sensing the change in the reflected visible illumination with the imaging sensor; and
    in response to sensing the change in the reflected visible illumination, deactivating the source of visible light.

21. The method of claim 20 wherein the item includes a symbol, and further comprising:
    attempting to read the symbol via the data reader;

in response to the change in the reflected visible illumination, generating a failure signal to indicate that the symbol was not read.

22. The method of claim 21 wherein generating the failure signal includes generating an audible tone.

23. The method of claim 20 wherein the item includes a symbol, and further comprising reading the symbol via the imaging reader.

24. The method of claim 23, wherein the imaging reader is sensitive to both infrared illumination and visible light, and the reading of the symbol includes reading the symbol via the reflected infrared illumination, the reflected visible illumination, or both.

25. A symbol reading device, comprising:
a data reader having a scan zone, the data reader including an imaging reader containing an imaging sensor, the imaging sensor being sensitive to visible illumination and infrared illumination;
an infrared illumination source that directs infrared illumination at the scan zone;
a visible light source coupled to the data reader and adapted to selectively direct visible illumination at the scan zone, the data reader responsive to receipt by the imaging sensor of infrared illumination reflected by an item placed in the scan zone to trigger the visible light source and thereby illuminate the item.

26. The device of claim 25 wherein the data reader comprises a presentation scanner.

27. The device of claim 25 wherein the data reader comprises a handheld scanner.

28. The device of claim 25 wherein the data reader comprises a bi-optic scanner.

29. The device of claim 25 wherein the visible light source includes an LED.

30. The device of claim 25 wherein the infrared illumination source includes an infrared LED.

31. The device of claim 25, further comprising a delay timer coupled to the visible light source for preventing the visible light source from being deactivated until after a predetermined minimum duration has elapsed from when the visible light source is triggered by the data reader.

32. The device of claim 25 wherein the data reader includes a set point for an infrared intensity threshold beyond which reflected infrared illumination received by the imaging reader will cause the data reader to trigger the visible light source.

33. The device of claim 32 wherein the set point is adjustable.

34. The device of claim 33, further comprising means for automatic set point adjustment.

35. A method of triggering a source of visible light for a data reader having a scan zone illuminated by ambient illumination, comprising:
placing an item in the scan zone, thereby imparting a change in the ambient illumination reaching the data reader, the item bearing an optical symbol containing encoded data therein;
at the data reader, detecting the presence of the item in the scan zone by sensing the change in the ambient illumination reaching the data reader;
in response to detecting the presence of the item in the scan zone, triggering a source of infrared illumination to illuminate the item with infrared illumination, the item thereby reflecting at least a portion of the infrared illumination as reflected infrared illumination; and
at the data reader, attempting to read the optical symbol and acquire the encoded data therein via the reflected infrared illumination;
in response to a failed attempt to read the symbol via the reflected infrared illumination, triggering a source of visible illumination.

36. A method of triggering a source of visible light for a data reader having a scan zone illuminated by ambient illumination, comprising:
placing an item in the scan zone, thereby imparting a change in the ambient illumination reaching the data reader, the item bearing an optical symbol containing encoded data therein;
at the data reader, detecting the presence of the item in the scan zone by sensing the change in the ambient illumination reaching the data reader;
in response to detecting the presence of the item in the scan zone, triggering a source of infrared illumination to illuminate the item with infrared illumination, the item thereby reflecting at least a portion of the infrared illumination as reflected infrared illumination; and
at the data reader, attempting to read the optical symbol and acquire the encoded data therein via the reflected infrared illumination;
reading the symbol; and
triggering a source of visible illumination.

37. A method of triggering a source of visible light for a data reader having a scan zone illuminated by ambient illumination, comprising:
placing an item in the scan zone, thereby imparting a change in the ambient illumination reaching the data reader, the item bearing an optical symbol containing encoded data therein;
at the data reader, detecting the presence of the item in the scan zone by sensing the change in the ambient illumination reaching the data reader;
in response to detecting the presence of the item in the scan zone, triggering a source of infrared illumination to illuminate the item with infrared illumination, the item thereby reflecting at least a portion of the infrared illumination as reflected infrared illumination; and
at the data reader, attempting to read the optical symbol and acquire the encoded data therein via the reflected infrared illumination;
sensing an intensity of the reflected infrared illumination; and
triggering a source of visible light when the intensity exceeds a preselected threshold intensity.

* * * * *

UNITED STATES PATENT AND TRADEMARK OFFICE
CERTIFICATE OF CORRECTION

| | | |
|---|---|---|
| PATENT NO. | : 7,527,207 B2 | Page 1 of 1 |
| APPLICATION NO. | : 11/293863 | |
| DATED | : May 5, 2009 | |
| INVENTOR(S) | : Acosta et al. | |

It is certified that error appears in the above-identified patent and that said Letters Patent is hereby corrected as shown below:

Abstract Item [57]
Line 4, after "includes" change "a" to --an--.
Line 10, change "that" to --the--.

Signed and Sealed this

Eleventh Day of August, 2009

David J. Kappos
*Director of the United States Patent and Trademark Office*